Patent [19] [11] 4,222,235
Adamson et al. [45] Sep. 16, 1980

[54] VARIABLE CYCLE ENGINE

[75] Inventors: Arthur P. Adamson, Cincinnati; Elmore V. Sprunger, Montgomery, both of Ohio

[73] Assignee: General Electric Company, Cincinnati, Ohio

[21] Appl. No.: 818,473

[22] Filed: Jul. 25, 1977

[51] Int. Cl.² .............................................. F02K 3/06
[52] U.S. Cl. .................................... 60/226 R; 60/262
[58] Field of Search ..................... 60/262, 226 R, 224, 60/39.75, 39.16 S, 39.16 C; 415/61; 149 R

[56] References Cited

U.S. PATENT DOCUMENTS

| | | |
|---|---|---|
| 2,409,177 | 10/1946 | Allen et al. |
| 2,465,099 | 3/1949 | Johnson |
| 2,619,795 | 12/1952 | Drake |
| 3,016,698 | 1/1962 | Sobey ................................ 60/262 |
| 3,368,352 | 2/1968 | Hewson .............................. 60/262 |
| 3,632,224 | 1/1972 | Wright et al. ...................... 415/149 |
| 3,677,012 | 7/1972 | Batscha ............................... 60/262 |
| 3,938,328 | 2/1976 | Klees .................................. 60/262 |
| 4,025,221 | 5/1977 | Kronogard ...................... 60/39.16 S |

FOREIGN PATENT DOCUMENTS

| | | | |
|---|---|---|---|
| 1077919 | 3/1960 | Fed. Rep. of Germany ............ 60/224 |
| 1081277 | 5/1960 | Fed. Rep. of Germany ............ 60/262 |
| 246174 | 9/1947 | Switzerland ........................... 60/224 |

Primary Examiner—Robert E. Garrett
Attorney, Agent, or Firm—Dana F. Bigelow; Derek P. Lawrence

[57] ABSTRACT

A variable cycle turboshaft engine includes a remote fan system and respective high and low pressure systems for selectively driving the fan system in such a manner as to provide VTOL takeoff capability and minimum specific fuel consumption (SFC) at cruise and loiter conditions. For takeoff the fan system is primarily driven by the relatively large low pressure system whose combustor receives the motive fluid from a core bypass duct and, for cruise and loiter conditions, the fan system is driven by both a relatively small high pressure core and the low pressure system with its combustor inoperative. A mixer is disposed downstream of the high pressure system for mixing the relatively cold air from the bypass duct and the relatively hot air from the core prior to its flow to the low pressure turbine.

27 Claims, 3 Drawing Figures

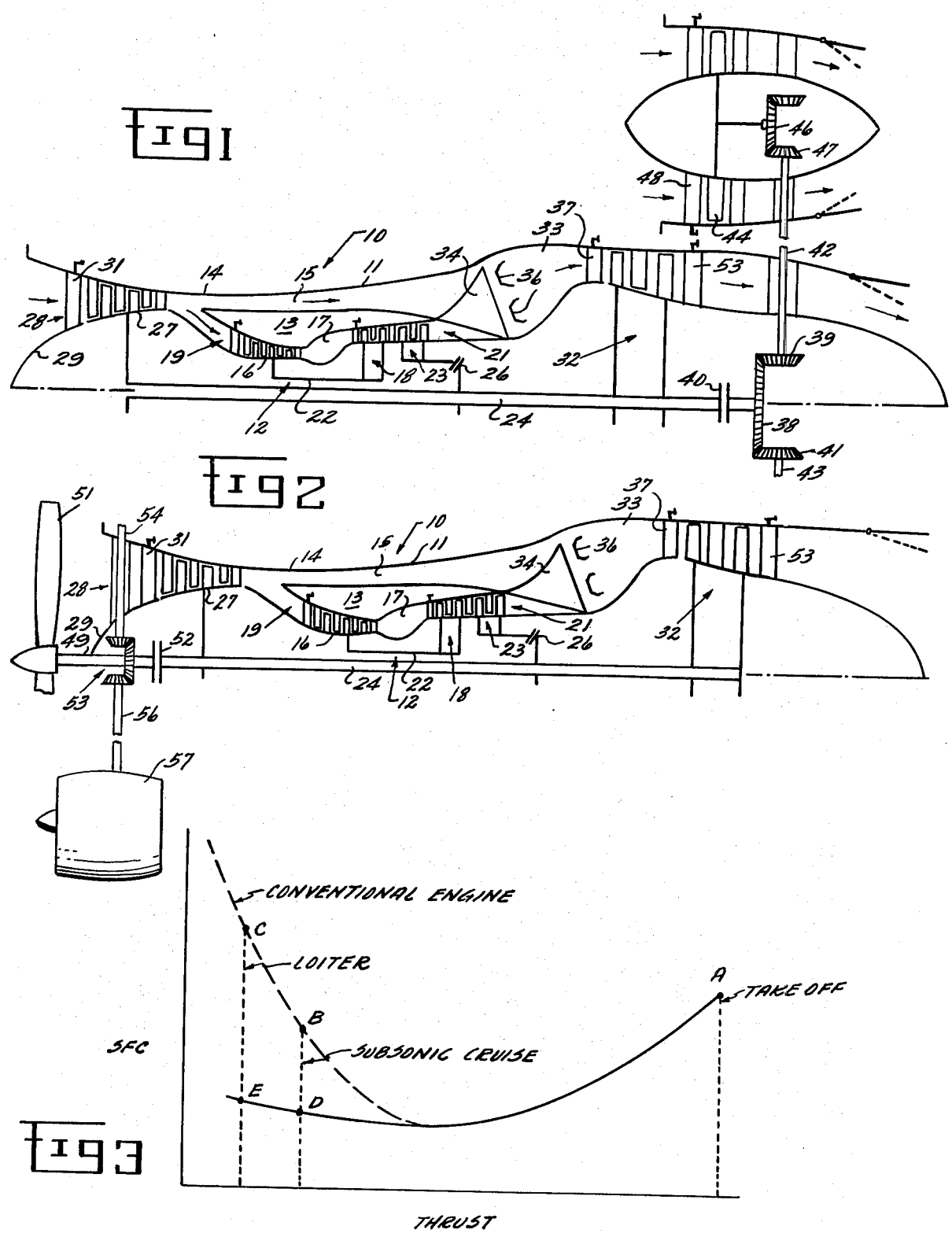

VARIABLE CYCLE ENGINE

BACKGROUND OF THE INVENTION

This invention relates generally to gas turbine engines and, more particularly, to a method and apparatus for cycling through takeoff, cruise and loiter conditions of operation.

Propulsion systems for conventional aricraft which takeoff and land from a runway in a standard manner are sized such that the maximum engine thrust/airplane weight ratio is approximately 0.3 to 0.4 with the specific fuel consumption (SFC) being relatively high at that thrust level. However, the design of the engine is such that at the thrust level required for cruise, the SFC is near a minimum.

In the design of a vertical takeoff and landing (VTOL) aircraft, the propulsion system is sized so as to provide thrust which is greater than the weight of the aircraft. However, it has been found that a conventional engine sized in this manner is much too large for efficient cruise or loiter operation in horizontal flight. That is, the relatively large engine must be slowed to such a degree that it is, in effect, operating "off design" and at a very high SFC. The problem of the VTOL aircraft is further magnified by the requirement to safely land the aircraft in the vertical mode when one of several engines has been shut down.

Various approaches to solving this problem have been unsatisfactory for one reason or another. The approach of using a plurality of gas generators and shutting down one or more of them during cruise operation solves the SFC problem but is not desirable because of the inefficient carrying of a plurality of shut-down engines during the majority of a flight mission time. Further, pilots are generally hesitant of the unnecessary shutting down of engines in flight.

Another approach involves the use of combinations of low fan pressure ratios for high lapse rates. This method reduces the SFC to a degree but does not bring it down to a point near the minimum design SFC as desired. Further, such an approach requires the use of an inordinately large fan.

It is, therefore, an object of the present invention to provide an aircraft propulsion system which is capable of vertical takeoff and landing, and which is also capable of efficient operation at cruise and loiter conditions.

Another object of the present invention is the provision in a VTOL aircraft to minimize the number of engines required.

Yet another object of the present invention is the provision in a VTOL aircraft for limiting the size of the fan or fans used.

Still another object of the present invention is the provision in a VTOL aircraft for selective cycling of an engine to obtain a minimum SFC at loiter and cruise conditions.

These objects and other features and advantages become more readily apparent upon reference to the following description when taken in conjunction with the appended drawings.

SUMMARY OF THE INVENTION

Briefly, in accordance with one aspect of the invention, a variable cycle turboshaft engine includes a relatively small, high pressure core system, a bypass duct passing therearound, and a relatively large low pressure system having its own combustor. Both the low pressure system and certain turbine stages in the core (a transfer turbine) are drivingly attached to the remote fan system by way of an overrunning clutch. For takeoff and landing operations, the low pressure combustor is actuated and the fan system is substantially driven by the low pressure system, with the core being substantially bypassed. During subsonic cruise and loiter flight conditions, the low pressure combustor is turned off and the core operates at a high pressure and temperature to provide substantial driving energy to the remote fan system by way of a transfer turbine which is geared to the low pressure shaft. The remainder of the low pressure shaft work is extracted by the large low pressure turbine which receives motive fluid both from the bypass duct and from the core discharge.

By another aspect of the invention, a mixer is disposed downstream of the core engine so as to receive the relatively hot core discharge gases and the relatively cold motive fluid from the bypass duct and mix them to provide a reasonably uniform temperature and pressure profile to the low pressure turbine.

By yet another aspect of the invention, low-flow techniques may be incorporated in the low pressure turbine and fan so as to effectively downsize the fan system during cruise and loiter flight conditions. Further, a variable leading edge outlet guide vane may be incorporated in the large low pressure turbine to accommodate the discharge swirl angle changes.

In the drawings as hereinafter described, a preferred embodiment and a modified embodiment are depicted; however, various other modifications and alternate constructions can be made thereto without departing from the true spirit and scope of the invention.

BRIEF DESCRIPTION OF THE DRAWINGS

FIG. 1 is a schematic illustration of a variable cycle engine in accordance with the preferred embodiment of the invention.

FIG. 2 is a modified embodiment thereof.

FIG. 3 is a graphic illustration comparing the SFC/thrust capabilities of a conventional VTOL engine with that of an engine embodying the present invention.

DESCRIPTION OF THE PREFERRED EMBODIMENT

Referring now to FIG. 1, the invention is shown generally at 10 as being incorporated into a turbofan engine 11 which comprises a core engine 12 having a supporting structure or casing 13 disposed in an annular fan casing 14 so as to cooperatively define a bypass duct 15 therebetween. The core engine 12 includes a high pressure compressor 16, a combustor 17 and a high pressure turbine 18 disposed in serial flow relationship along an annular flow core engine passageway having an inlet 19 and exhaust 21. The compressor 16 and the turbine 18 are interconnected by a core engine shaft 22.

Disposed immediately downstream of the high pressure turbine 18 is a low pressure or transfer turbine 23 which is drivingly attached to a low pressure shaft 24 by way of a reduction gear 26. The casing 13 supports the low pressure shaft 24 for rotation independently of the core engine shaft 22 in a manner well known in the art. Drivingly attached to the front end of the low pressure shaft 24 is a low pressure compressor 27 extending generally radially across an annular inlet duct 28 which is defined on the outer side by the fan casing 14 and on the inner side thereof by a bullet nose 29. A plurality of inlet guide vanes 31, preferably of the variable pitch type, are disposed forward of the compressor 27 for selective modulation of the airflow in the inlet. The low pressure compressor 27, which acts to compress the air prior to its flow into the bypass duct 15 and the compressor inlet duct 19, is driven by the low pressure shaft 24 which receives its power from both the transfer turbine 23 and a relatively large, low pressure ratio turbine 32 with the particular balance of work being modulated in accordance with a prescribed cycle as will be described hereinafter.

As can be seen in FIG. 1, the bypass duct 15 expands in annular cross-sectional size as it extends rearwardly past the core engine 12 to form a burner chamber 33 forward of the low pressure turbine 32. Connected to the exhaust end 21 of the transfer turbine 23 is a mixer 34 of a conventional type which receives hot discharge gases from the core engine 12 and relatively cold air from the bypass duct 15 to obtain a mixture of motive fluid having a reasonably uniform temperature and pressure profile for entry into the low pressure turbine 32. A plurality of burners 36 are disposed in the chamber 33, immediately downstream of the mixer 34, for introducing atomized fuel into the chamber 33 to facilitate combustion with the resulting hot gases flowing through the low pressure turbine 32 so as to impart energy thereto. A plurality of variable area turbine nozzles 37 are provided at the entrance to the low pressure turbine 32 for the purpose of selectively controlling the amount of air that flows to the turbine.

Drivingly connected to the aft ends of the low pressure shaft 24 by way of an overriding clutch 40 is a drive bevel gear 38 and associated driven bevel gears 39 and 41 which are rigidly connected to drive shafts 42 and 43, respectively. Each of the drive shafts 42 and 43 is connected to drive a remote fan 44 by way of appropriate mechanical connection such as by bevel gears 46 and 47 or the like. Each of the remote fans 44 includes variable inlet guide vane systems 48 which are used for control purposes during landing and takeoff and for a low-flowing at loiter and cruise conditions of flight.

It should be understood that, although the preferred embodiment has been depicted and described as having a pair of remote fans 44 which are driven by a pair of drive shafts extending oppositely from the centerline of the engine, any number of such remote fan systems may be placed or "nested" around the main turbofan engine 11 and may be driven from the low pressure shaft 24 by any of various other means such as, for example a hydraulic drive system. Further, where there is more than one turbofan engine 11, with each one having a plurality of remote fans 44 associated therewith, the remote fans may be interconnected by cross shafts extending between the different turbofan engines 11 so that if one of the turbofan engines is inoperable, its remote fans may be driven by another turbofan engine.

Referring now to FIG. 2, a modified embodiment is shown wherein the remote fan system emanating from the rear end of the low pressure shaft 24 is removed and replaced by a forward extension 49 of the low pressure shaft 24 and a single large fan 51 concentrically disposed forward of the low pressure compressor 27. A clutch 52 is placed within the shaft connection so as to enable the disengagement of the fan to allow free wheeling thereof during certain periods of operation. A bevel gear assembly 53 with associated drive shafts 54 and 56 is provided for engine cross-over during an engine-out situation or for driving another remote fan 57, respectively.

The above-described variable cycle engine is operated in the following manner. During the vertical takeoff mode of operation, a large amount of thrust is required as represented by point A in FIG. 3. Hence, both the small core engine 12 and the larger low pressure system with burners 36 are in operation. In this mode the low pressure compressor 27 supplies pressurized air to both the bypass duct 15 and the core inlet 19. The core engine 12 further compresses and heats its air to a high pressure, high temperature condition and, while performing no substantial work by way of the transfer turbine 23, discharges these gases to the mixer 34 where they are combined with the relatively cold air from the bypass duct 15. The relatively homogeneous mixture is then introduced into the burner chamber 33 where it is further heated prior to entry into the low pressure turbine 32. This relatively large turbine then provides rotational power to both the low pressure compressor 27 and to the remote fans 44 (or 51). The inlet guide vanes 31 and 48, and the variable area turbine nozzles 37, are placed in a position so that maximum flow and pressure ratio are obtained.

While the low pressure turbine 32 provides almost all of the work during this mode of operation, the small high pressure core 12 operates at part aerodynamic speed so as not to exceed either a compressor discharge temperature limit or a transfer turbine discharge temperature limit. The effective system then is principally comprised of a moderate pressure ratio compressor 27, a combustor 33 and a turbine 32 sized specifically for supplying the high thrust levels needed for takeoff. Although the core engine 12 provides very little work by way of the transfer turbine 23, its contribution to the overall propulsion effort during this mode of operation by way of the discharge of high pressure and high temperature gases to the mixer, is significant. As can be seen in FIG. 3, the SFC for such a takeoff mode of operation is relatively high but, since the time duration of such operation is limited, the higher SFC is relatively unimportant and therefore the pressure ratio of the low pressure system can be moderate. Further, the efficiency of the transfer turbine 23 is unimportant at this condition since very little work is involved.

If after takeoff the engine were operated in the manner described hereinabove, the low pressure turbine 32 would continue to perform substantially all of the work and, as the thrust was reduced for subsonic cruise and loiter conditions, the SFC/thrust curve would follow the dashed line to points B and C, respectively. However, since this SFC would be prohibitive over long periods of loiter operation, the engine cycle is modified as follows. For loiter and cruise conditions, the large combustor with burners 36 is not lit and the amount of work performed by the low pressure turbine 32 is accordingly reduced. The core engine 12, which must now pick up more of the work, is operated at a higher speed such that the high pressure compressor 16 supercharges the core engine 12 and a substantial amount of work (approximately 50%) is extracted by the transfer turbine 23 to the extent that a static pressure balance is obtained at a point where the hot discharge flow is mixed with the bypass flow. The remainder of the low pressure shaft work is then extracted by the large variable area turbine 32 which is relatively unloaded at this condition. A variable leading edge outlet guide vane 53 may be required for the large turbine to accommodate the discharge swirl angle changes. The inlet guide vanes 31 and 48 can be positioned so as to present a low-flow condition to thereby effectively downsize the fan system. In this way, the low pressure shaft work is performed at the highest pressure and temperature possible to obtain maximum efficiency and the SFC levels are substantially reduced as represented by the points D and E on the curve of FIG. 3.

While the present invention has been described in terms of a preferred embodiment and a modified embodiment of a variable cycle engine, it will be understood that various other modifications and configurations can be made while remaining within the scope of the invention as contemplated. Further, it should be understood that while the invention has been discussed in terms of a VTOL application, no attempt has been made to describe the various methods and means by which the various thrust flows may be directed to obtain the desired control of an aircraft.

What is claimed is:

1. An improved turbomachine of the type having in flow series a compressor, a combustor and a turbine wherein the improvement comprises:
   (a) a bypass duct disposed adjacent the combustor and fluidly communicating with the compressor;
   (b) a mixer partially disposed in said bypass duct for receiving a portion of relatively cold air from said compressor and a portion of relatively hot air from said combustor and presenting a mixed fluid to the turbine downstream for driving the compressor; and
   (c) a transfer turbine for receiving hot gases from the combustor, said transfer turbine being drivingly connected to the compressor by way of reduction gear means.

2. An improved turbomachine as set forth in claim 1 and including a burner apparatus disposed between said mixer and the turbine for selectively introducing a fuel into said mixture for combustion thereof.

3. An improved turbomachine as set forth in claim 1 wherein said turbine includes a variable area turbine nozzle.

4. An improved turbomachine as set forth in claim 1 wherein said turbine includes a variable area outlet guide vane.

5. An improved turbomachine as set forth in claim 1 and including a second compressor disposed between the compressor and the combustor for further compressing that portion of the air from the compressor which does not flow through said bypass duct.

6. An improved turbomachine as set forth in claim 5 and including a second turbine for driving said second compressor.

7. An improved turbomachine as set forth in claim 1 wherein said turbine is drivingly connected to said compressor.

8. An improved turbomachine as set forth in claim 7 wherein said turbine includes stages which are drivingly connected to at least one fan.

9. An improved turbomachine as set forth in claim 8 wherein said at least one fan comprises a plurality of fans located aft of the combustor.

10. An improved turbomachine as set forth in claim 8 wherein said at least one said fan is located forward of said compressor.

11. An improved turbomachine as set forth in claim 1 wherein said second turbine is drivingly connected to at least one fan.

12. An improved turbomachine as set forth in claim 11 wherein said driving connection includes a reduction gear.

13. An improved turbomachine as set forth in claim 11 wherein said at least one fan includes a plurality of fans located aft of the combustor.

14. An improved turbomachine as set forth in claim 11 wherein at least one fan is located forward of said compressor.

15. An improved turbomachine of the type having in serial flow relationship a low pressure compressor, a high pressure compressor, a combustor and a high pressure turbine wherein the improvement comprises:
    (a) a bypass duct for receiving a portion of the motive fluid from the low pressure compressor and bypassing it around the combustor;
    (b) a low pressure turbine located downstream from the high pressure turbine for receiving a mixture of said portion of motive fluid from said bypass duct and the discharge from the high pressure turbine to provide motive power to the low pressure compressor, and
    (c) a transfer tubine for receiving hot gases from the combustor, said transfer turbine being drivingly connected to the low pressure compressor by way of reduction gear means.

16. An improved turbomachine as set forth in claim 15 and including a mixer located between said high pressure and low pressure turbines for receiving a relatively cold motive fluid from said bypass duct and a relatively hot discharge from the high pressure turbine and presenting a relatively homogeneous mixture of motive fluid to said low pressure turbine.

17. An improved turbomachine as set forth in claim 15 and including a burner apparatus between said high and low pressure turbines for selectively introducing fuel into said mixture for combustion thereof.

18. An improved turbomachine as set forth in claim 15 wherein said low pressure turbine includes a variable area turbine nozzle.

19. An improved turbomachine as set forth in claim 15 and including at least one fan to which the second low pressure turbine is drivingly connected.

20. An improved turbomachine as set forth in claim 19 wherein said at least one fan comprises a plurality of fans located aft of said low pressure turbine.

21. An improved turbomachine as set forth in claim 19 wherein said at least one fan is located forward of said low pressure compressor.

22. An improved turbomachine as set forth in claim 15 and including at least one fan which is drivingly connected to said low pressure turbine.

23. An improved turbomachine as set forth in claim 22 wherein said at least one fan comprises a plurality of fans located aft of said low pressure turbine.

24. An improved turbomachine as set forth in claim 22 wherein said at least one fan is located forward of said low pressure compressor.

25. A method of operating an aircraft engine of the type having in serial flow relationship:
    a low pressure compressor;
    a high pressure core engine, including a high pressure compressor, a combustor, and a high pressure turbine;
    a burner and a low pressure turbine, and having a bypass duct around the core engine, comprising the steps of (a) for takeoff conditions turning the burner on such that substantially all thrust is derived from the low pressure turbine; and
(b) for cruise conditions, turning the burner off such that a substantial portion of thrust is produced by the high pressure turbine driving the low pressure compressor by way of reduction gear means.

26. A method as set forth in claim 25 including the step of passing the core discharge air and the bypass air through a mixer during both takeoff and cruise conditions.

27. A method as set forth in claim 25 and including the step of driving at least one low pressure fan with the low pressure turbine during both takeoff and cruise operating conditions.

* * * * *